United States Patent [19]

Cowan

[11] Patent Number: 4,877,820

[45] Date of Patent: Oct. 31, 1989

[54] CROSS-LINKED ORGANOSILOXANE POLYMERS

[75] Inventor: Patrick J. Cowan, Wilmington, Del.

[73] Assignee: Hercules Incorporated, Wilmington, Del.

[21] Appl. No.: 228,083

[22] Filed: Aug. 4, 1988

Related U.S. Application Data

[63] Continuation-in-part of Ser. No. 28,430, Mar. 20, 1987, abandoned.

[51] Int. Cl.$^4$ .......................... C08K 7/02; C08G 77/06
[52] U.S. Cl. ..................................... 523/222; 524/588; 524/861; 528/15; 528/25; 528/31; 525/479; 556/431; 556/434; 556/451
[58] Field of Search ............................. 528/31, 15, 25; 556/431, 434, 451; 523/222; 524/861, 588

[56] References Cited

U.S. PATENT DOCUMENTS 4,640,968 2/1987 Watanabe et al. ..................... 528/32
4,728,687 3/1988 Watanabe et al. ................... 524/493

FOREIGN PATENT DOCUMENTS 204171 5/1986 European Pat. Off. .
2595363 9/1987 France .
2595364 9/1987 France .
767112 9/1980 U.S.S.R. ............................. 556/431
1439945 6/1976 United Kingdom .

OTHER PUBLICATIONS

"Polycycloalkylene-Siloxane Polymers: Synthesis and Thermal Study", 16 Journal of Polymer Science: Polymer Chemistry Edition, 483–490 (1978).

E. P. Pluddeman et al, "Epoxyorganosiloxanes", 81 Journal of the American Chemical Society 2632, col. 2, lines 11–12 (1958).

J. L. Speier et al, "The Addition of Silicon Hydrides to Olefinic Double Bonds. Part II. The Use of Group VIII Metal Catalysts", 79 Journal of the American Chemical Society 974, 1975 (1957).

Primary Examiner—Melvyn I. Marquis
Assistant Examiner—Ralph H. Dean, Jr.
Attorney, Agent, or Firm—Mark D. Kuller; William S. Alexander

[57] ABSTRACT

Disclosed are novel, cross-linked or cross-linkable linear poly(organohydrosiloxanes) wherein the cross-linking units are derived from polycyclic polyenes. These polymers or prepolymers are prepared by reacting or partially reacting the poly(organohydrosiloxanes) with the polycyclic polyene in the presence of a catalyst.

24 Claims, No Drawings

CROSS-LINKED ORGANOSILOXANE POLYMERS

This is continuation-in-part of application Ser. No. 07/028,430, filed Mar. 20, 1987, by Patrick J. Cowan for "Cross-linked Organosiloxane Polymers", now abandoned.

This invention relates to cross-linked or cross-linkable poly(organosiloxanes).

It has been known for quite some time that compounds containing the hydrosilane (i.e., ≡Si—H) functional group can be reacted with alkenes containing vinyl (terminal) unsaturation to form alkyl silanes. The simplest example of this reaction is the addition of ethylene to trichlorosilane to form ethyl trichlorosilane. This exothermic reaction is catalyzed by platinum halide compounds and proceeds readily to virtually 100% conversion.

This reaction, known as the hydrosilation reaction, has been effective with a large number of vinyl compounds. Likewise, other silanes, such as dialkyl silanes, halo-alkyl silanes and alkoxy silanes, have been found to undergo this reaction so long as they possess the requisite ≡Si—H group.

The hydrosilation reaction has been used with difunctional linear siloxanes to build up long chain siloxanes. For example, U.S. Pat. No 3,410,886 teaches reacting a hydroterminated trisiloxane with a vinyl-terminated trisiloxane to form a linear compound containing six silicon atoms. U.S. Pat. Nos.3,220,972 and 3,271,362 teach that a compound containing both hydrogen-silicon linkages and aliphatic unsaturation can react with itself.

A few instances have been reported in which polymerization takes place via reaction between compounds containing a vinyl silane (≡Si—CH=CH₂) group and a hydrosilane (≡Si—H) group to form cross-linked polymers. Examples of this type of polymer are found in U.S. Pat. Nos. 3,197,432; 3,197,433; and 3,438,936. Each of these patents teaches the preparation of polymers from vinyl alkyl cyclotetrasiloxanes and alkyl cyclotetrasiloxanes containing 2 to 4 silanic hydrogen atoms.

A number of organosilicon polymers have been disclosed in the prior art, which are actually vinyl addition polymers modified with silicon-containing moieties. Polymerization takes place in some cases via conventional olefin polymerization routes without making use of the hydrosilation reaction. The silicon-containing moiety is then present as a polymer modifier. Examples of such polymerizations can be found in, e.g., U.S. Pat. Nos. 3,125,554; 3,375,236; 3,838,115; 3,920,714; and 3,929,850.

There is a need for high molecular weight organosilicon polymers that have outstanding physical, thermal and electrical properties and improved resistance to water. There is also a need for a method of preparing the aforesaid high molecular weight organosilicon polymers and of preparing shaped items therefrom.

According to the invention, a cross-linked or cross-linkable organohydrosiloxane polymer is characterized in that the organohydrosiloxane is a linear poly(organohydrosiloxane) having at least 30% of its ≡SiH groups reacted with hydrocarbon residues derived from polycyclic polyenes.

Preferably, poly(organohydrosiloxane) has the general formula:

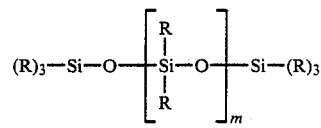

wherein R is a substituted or unsubstituted, saturated alkyl radical or a substituted or unsubstituted phenyl radical, and about 1% to about 50%, preferably 5 to about 50%, of the R's are hydrogen and m is an integer from about 5 to 1000, preferably 5 to 100, and the maximum value of m is desirably 40.

Preferably, according to the invention, the poly(organohydrosiloxane) defined by the above general formula is trimethylsiloxy-terminated methylhydropolysiloxane. Other exemplary poly(organohydrosiloxanes) include:

trimethylsiloxy-terminated dimethylsiloxane-methylhydro
  siloxane copolymer,
dimethylsiloxy-terminated dimethylsiloxane
  methylhydrosiloxane copolymer,
dimethylsiloxy-terminated polydimethylsiloxane,
trimethylsiloxy-terminated methyloctylsiloxane
  methylhydrosiloxane copolymer,
dimethylsiloxy-terminated phenylmethylsiloxane
  methylhydrosiloxane copolymer,
trimethylsiloxy-terminated methylcyanopropylsiloxane
  methylhydrosiloxane copolymer,
trimethylsiloxy-terminated 3,3,3-trifluoropropylmethyl
  siloxane methylhydrosiloxane copolymer,
trimethylsiloxy-terminated 3-aminopropylmethylsiloxane
  methylhydrosiloxane copolymer,
trimethylsiloxy-terminated 2-phenylethylmethylsiloxane
  methylhydrosiloxane copolymer, and
trimethylsiloxy-terminated 2-(4-methylphenyl)
  ethylmethylsiloxane-methylhydrosiloxane copolymer.

Cross-linking of the poly(organohydrosiloxane) takes place via the hydrosilation reaction with a polycyclic polyene. Two or more carbon-to-carbon double bonds react with a like number of silicon-hydrogen linkages to form the cross-linked product.

Cyclic polyenes that can be employed are polycyclic hydrocarbon compounds having at least two non-aromatic, non-conjugated carbon-to-carbon double bonds. Exemplary compounds include cyclopentadiene oligomers such as dicyclopentadiene and cyclopentadiene trimer, methyl dicyclopentadiene, dimethanohexahydronaphthalene, norbornadiene, norbornadiene dimer, and substituted derivatives of any of these. Preferred compounds are dicyclopentadiene and cyclopentadiene trimer, the most preferred of which is dicyclopentadiene. Mixtures of polycyclic polyenes, particularly the cyclopentadiene oligomers, are useful.

Polymerization can be promoted thermally or by using well known hydrosilation catalysts, e.g., metal salts and Group VIII elements. Radical generators such as peroxides and azo compounds may also be used, either by themselves or in combination with other catalysts.

The hydrosilation reaction proceeds readily in the presence of a platinum-containing catalyst. The preferred catalyst, in terms of both reactivity and cost, is chloroplatinic acid (H₂PtCl₆·nH₂O). Catalyst concentrations of 0.001 to about 0.4%, preferably 0.0025 to 0.1%, by weight, based on weight of the polyene monomer, will effect smooth and substantially complete reaction. Other platinum compounds can also be used to advantage in some instances, such as PtCl₂. Platinum metal on carbon is also effective for carrying out the reaction at high temperatures. Other useful platinum catalysts are disclosed in, e.g., U.S. Pat. Nos. 3,220,971; 3,715,334; 3,159,662; and 4,600,484. An exhaustive discussion of the catalysis of hydrosilation can be found in Advances in Organometallic Chemistry, Vol. 17, beginning on page 407.

In one embodiment, to form the cross-linked polymers of this invention, the platinum-containing catalyst and polycyclic polyene are mixed and heated to form a complex, and, then, the complex and the poly(organohydrosiloxane) are combined, and the mixture is heated for a time sufficient for substantially all of the polycyclic polyene to react with silanic hydrogen. It is often preferred to slowly add the two reagent streams to the reactor in order to control the heat of reaction. In some cases a single heating temperature can be used and maintained until the reaction is driven to substantial completion. This is suitable for lower levels of cross-linking. However, for higher levels of cross-linking, heating is usually carried out in stages. Thus, periodic increases in temperature are effected over time to drive the reaction as the molecular weight increases.

To prepare shaped objects, the reaction can be carried out in a mold, at least up to the point at which sufficient cross-linking has taken place to fix the polymer in the desired shape. Heat treatment can then be continued after removal from the mold in order to drive the reaction to completion.

It is possible to prepare polymers of a wide range of cross-link density within the scope of this invention. Cross-link density is a function of the number of ≡Si—H linkages and the ratio of silane hydrogens to carbon-carbon double bonds in the reaction mix. This ratio can be from about 5 to 1 up to about 1 to 2.

Properties and physical form of the cross-linked polymers vary with cross-link density. Thus, it has been found possible to prepare tacky solids, elastomeric materials and tough glassy polymers. The tacky solids and elastomeric materials, while they have utility on their own merits, are usually intermediate products that are further polymerized to the tough glassy polymer state by heat treatment to effect further cross-linking.

By selecting appropriate cyclic polyenes, the initial product of the reaction at lower temperatures can be recovered as a flowable, heat-curable polymer, even though the ratio of

to ≡Si—H is otherwise suitable for cross-linking. Such cyclic polyenes musr have chemically distinguishable carbon-carbon double bonds, i.e., one being more reactive during hyrosilation than the other (more "electron-rich" and/or less hindered), and therefore include, for example, cyclopentadiene oligomers such as dicyclopentadiene and cyclopentadiene trimer, and methyl dicyclopentadiene.

Such flowable, heat-curable polymers, analogous to the so-called B-stage resins encountered in other thermoset preparations, can be recovered and stored if desired for curing at a later time. They are stable at room temperature for varying periods of time, but upon reheating to an appropriate temperature they cure to the same types of polymers as are prepared when complete polymerization is carried out substantially immediately.

The B-stage type polymers can be prepared by heating the reaction mass to about 40° to 65° C. and maintaining it at that point for several hours, and then interrupting the reaction by removing the heat until such time as it is desired to complete the transition to a cross-linked elastomeric or glassy polymer. The flowable polymers will have 5 to 90%, preferably 30 to 60% of the ≡Si—H groups reacted. These B-stage type polymers are generally viscous, flowable liquids at room temperature. The viscosity of such liquids varies with the degree of ≡Si—H groups reacted. The practitioner can select, for his own purposes, the point at which the polymerization is to be interrupted by monitoring the viscosity build-up.

The unique silicon-containing polymers of this invention have a range of utilities, depending upon their physical form. Tacky solids or the B-stage type liquid materials are useful as tackifiers in pressure sensitive adhesives and as contact adhesives. They are also useful as structural adhesives, curable in situ, to form strong bonds due to a high affinity of the silicones for polar metal or glass surfaces. The elastomeric embodiments make excellent potting compounds for electronic applications, since they can be cured in situ and are insensitive to water.

Thermal properties of these polymers are also outstanding. The cross-link density can be controlled to give a wide range of glass transition temperatures. Thermal stability in air or nitrogen is excellent with usually less than 10% weight loss at 500° C. during thermogravimetric analysis. At 1100° C. in air or nitrogen, they leave residue ranging from about 50% weight to about 75 weight % residue. The residues maintain some structural integrity.

The polymers are fire resistant. They burn very slowly when subjected to a flame and self-extinguish when the flame is removed.

A particularly striking property of these polymers is their virtually total insensitivity to water. They have been found to be unaffected by boiling water after extended periods, e.g., 5 days or more. Glass laminates exposed to boiling water exhibit minimal weight gain and insignificant or no change in rheometric properties (e.g., glass transition temperature). Further cross-linking may be achieved by platinum catalyzed reaction of ≡Si—H with ≡Si—OH. The ≡Si—OH groups are generated by the reaction of ≡Si—H with water so properties can actually improve upon exposure to water.

The polymers also exhibit high temperature resistance, which makes them useful as refractory materials and also as ablative materials for, e.g., rocket reentry cones.

A number of options exist for incorporating additives into the polymer. Additives such as fillers and pigments are readily incorporated. Carbon black, vermiculite, mica, wollastonite, calcium carbonate, sand, glass spheres, and glass beads or ground glass are examples of fillers that can be incorporated. Fillers can serve either as reinforcement or as fillers and extenders to reduce the cost of the molded product. When used, fillers can be present in amounts up to about 80%.

Glass or carbon, e.g., graphite fibers are wetted very well by the liuid prepolymer embodiment making the polymers excellent matrix materials for high strength composite structures. Thus a mold containing the requisite staple or continuous filament can be charged with the B-stage type prepolymer and the prepolymer cured to form the desired composite structure. Fiber in fabric form (e.g., a woven glass mat) can also be employed. Fiber reinforced composites of the polymers of this invention can contain as much as 80% of fibrous reinforcement, and, when fully cured, typically exhibit extremely high tensile and flexural properties and also excellent impact strength. Other types of fibers, e.g., metal, ceramic or synthetic polymer fibers, can also be used.

Stabilizers and antioxidants are useful to maintain the storage stabilty of the prepolymers and the thermal oxidative stability of the final product.

In the examples that follow, a series of poly(methylhydrosiloxanes) were cross-linked with polycyclic polyenes under the influence of chloroplatinic acid catalyst. The poly(methylhydrosiloxanes) have the general formula:

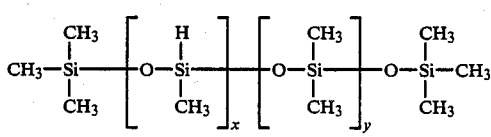

The following polymers were cross-linked:

| Designation | $x^{(a)}$ | $y^{(a)}$ | Formula$^{(b)}$ Weight |
| --- | --- | --- | --- |
| PS-1 | 22 | 0 | 1,500 |
| PS-2 | 35 | 0 | 2,270 |
| PS-3 | 6 | 6 | 950 |
| PS-4 | 9 | 17 | 2,000 |
| PS-5 | 5 | 25 | 2,250 |

$^{(a)}$x and y estimated based on data from supplier.
$^{(b)}$Approximate formula weight as reported by supplier.

EXAMPLE 1

A dry, $N_2$, sparged vessel was charged with a stir bar and 0.0113 g of chloroplatinic acid. The vessel was sealed and charged with 13.69 g of norbornadiene. The mixture was stirred for 30 minutes at 50° C. PS-3 (43.46 g) was added and the reaction mixture stirred 16 hours at 50° C. A sample of the viscous, flowable reactinn mixture was poured into an aluminum pan and the sample was heated in a nitrogen sparged oven at 150° C. for 16 hours, 225° C. for 2 hours, 250° C. for 2 hours and 280° C. for 16 hours. The product was a clear elastomer.

EXAMPLE 2

Following the general procedure in Example 1, PS-3 (68.63 g) was added to a heated (73° C.) mixture of norbornadiene (21.63 g) and chloroplatinic acid (0.0183 g) and the resulting mixture was stirred for 2 hours at 73° C. The reaction mixture was injected into a teflon-coated mold and the mold was placed in a nitrogen sparged oven at 150° C. for 16 hours. The clear cross-linked sample was removed from the mold and postcured at 200° C. for 2 hours and 280° C. for 4 hours to give a clear elastomer.

EXAMPLE 3

Following the general procedure in Example 1, PS-3 (76.03 g) was added to a heated (70° C.) mixture of dicyclopentadiene (34.40 g) and chloroplatinic acid (0.0221 g). The reaction mixture exothermed to 115° C. 20 seconds after the PS-3 addition. The mixture was stirred for 5 hours at 100° C. and then injected into a teflon-coated mold. The mold was placed in a nitrogen sparged oven and heated 11 hours at 175° C. and 24 hours at 200° C. The cross-linked sample was a clear elastomer.

EXAMPLE 4

Following the general procedure in Example 1, PS-3 (8.71 g) was added to a heated (50° C.) mixture of dimethanohexahydronaphthalene (4.71 g) and chloroplatinic acid (0.0027 g). The reaction mixture exothermed to 159° C. and set up into a clear elastomer 3 minutes after the PS-3 addition. The elastomer was removed from the reaction vessel and postcured in a nitrogen sparged oven 2 hours at 225° C., 2 hours at 250° C. and 16 hours at 280° C. The postcured sample was a clear elastomer.

EXAMPLE 5

Following the general procedure in Example 1, a solution of PS-3 (19.72 g) in methylene chloride (2 ml) was added to a heated (70° C.) mixture of dimethanohexahydronaphthalene (10.66 g) and chloroplatinic acid (0.0061 g). The reaction mixture exothermed to 153° C. and set up into a flexible foam 60 seconds after addition of the PS-3/$CH_2Cl_2$ addition. The foam was heated for 2 hours at 75° C. and removed from the reaction vessel. The foam was then postcured 2 hours at 150° C., 4 hours at 200° C. and 4 hours at 280° C. to give a white elastomeric foam.

EXAMPLE 6

Following the general procedure in Example 1, PS-4 (17.5 g) was added to a heated mixture (50° C.) of norbornadiene (3.82 g) and chloroplatinic acid (0.0042 g). The reaction mixture was stirred for 16 hours at 50° C. A sample of the reaction mixture was poured into an aluminum pan and cured 16 hours at 150° C., 2 hours at 225° C., 2 hours at 250° C. and 16 hours at 280° C. The cross-linked sample was a clear elastomer.

EXAMPLE 7

Following the general procedure in Example 1, PS-4 (14.23 g) was added to a heated mixture (50° C.) of dicyclopentadiene (4.45 g) and chloroplatinic acid (0.0037 g). The reaction mixture was stirred for 16 hours at 50° C. The reaction mixture was poured into an aluminum pan and cured 16 hours at 150° C., 2 hours at 225° C., 2 hours at 250° C. and 16 hours at 280° C. to give a clear elastomer.

EXAMPLE 8

Following the general procedure in Example 1, PS-5 (56.8 g) was added to a heated (60° C.) mixture of norbornadiene (6.42 g) and chloroplatinic acid (0.0125 g). The reaction mixture was stirred for 16 hours at 60° C. The reaction mixture was poured into an aluminum pan and cured 16 hours at 150° C., 2 hours at 225° C., 2 hours at 250° C. and 16 hours at 280° C. to give a clear elastomer.

EXAMPLE 9

Following the general procedure in Example 1, PS-5 (78.09 g) was added to a heated (75° C.) mixture of norbornadiene (8.80 g) and chloroplatinic acid (0.0177 g). The reaction mixture was stirred for 2 hours at 75° C. and injected into a teflon-coated mold. The mold was placed in a nitrogen sparged oven and heated for 16 hours at 150° C. The clear elastomer was removed from the mold and post cured 4 hours at 200° C. to give a clear elastomer.

EXAMPLE 10

Following the general procedure in Example 1, PS-1 (10.0 g) was added to a heated (60° C.) mixture of dicyclopentadiene (9.83 g) and chloroplatinic acid (0.0040 g). The reaction mixture exothermed to 180° C. 15 seconds after the PS-1 addition. The mixture was stirred for 2 hours at 60° C., then poured into an aluminum pan. The sample was cured for 40 hours at 150° C., 2 hours at 225° C., 2 hours at 250° C. and 16 hours at 280° C. to give a hard, glassy clear solid.

EXAMPLE 11

Following the general procedure in Example 1, PS-1 (48.75 g) was added to a heated (68° C.) mixture of dicyclopentadiene (47.91 g) and chloroplatinic acid (0.0196 g). The reaction mixture exothermed to 133° C. 20 seconds after the PS-1 addition. The reaction mixture was stirred for 16 hours at 130° C., then injected into a teflon-coated mold and cured for 16 hours at 150° C. to give a hard, glassy clear solid.

EXAMPLE 12

Following the general procedure in Example 1, PS-1 (5.68 g) was added to a heated (75° C.) mixture of dimethanohexahydronaphthalene (6.67 g) and chloroplatinic acid (0.0025 g). The reaction mixture exothermed to 200° C. and the mixture polymerized to a white elastomer. The sample was removed from the reaction vessel and postcured for 2 hours at 225° C., 2 hours at 250° C. and 16 hours at 280° C. to give a hard, glassy clear solid.

EXAMPLE 13

Following the general procedure in Example 1, a solution of PS-1 (7.50 g) in methylene chloride (2 ml) was added to a heated (70° C.) mixture of dimethanohexahydronaphthalene (8.80 g) and chloroplatinic acid (0.0033 g). The reaction mixture exothermed to 181° C. and set into a white foam 120 seconds after addition of the PS-1/CH$_2$Cl$_2$ solution. The foam was removed from the reaction vessel and cured for 16 hours at 200° C. and 24 hours at 280° C. to give a glassy white foam.

EXAMPLE 14

Following the general procedure in Example 2, PS-2 (9.71 g) was added to a heated (65° C.) mixture of norbornadiene (6.91 g) and chloroplatinic acid (0.0033 g). The reaction mixture was stirred for 16 hours at 65° C. to give a clear elastomer. The sample was removed from the reaction vessel and cured for 16 hours at 200° C., 2 hours at 225° C., 2 hours at 250° C. and 16 hours at 280° C. to give a clear glassy solid.

EXAMPLE 15

Following the general procedure in Example 1, PS-2 (9.71 g) was added to a heated (65° C.) mixture of norbornadiene (6.91 g) and chloroplatinic acid (0.0033 g). The reaction mixture was stirred for 2 hours at 65° C. and poured into an aluminum pan. The sample was cured for 16 hours at 150° C. and 7 hours at 200° C. to give a hard, clear, glassy solid.

EXAMPLE 16

Following the general procedure in Example 1, PS-2 (16.0 g) was addd to a heated (65° C.) mixture of dicyclopentadiene (16.53 g) and chloroplatinic acid (0.0064 g). The reaction mixture exothermed to 182° C. 15 seconds after the PS-2 addition. The reaction mixture was stirred for 16 hours at 55° C. and 48 hours at 75° C. The mixture was poured into an aluminum pan and cured for 16 hours at 200° C., 2 hours at 225° C., 2 hours at 250° C. and 16 hours at 280° C. to give a hard, clear, glassy solid.

EXAMPLE 17

Following the general procedure in Example 1, PS-2 (76.21 g) was added to a heated (75° C.) mixture of pentadiene (77.90 g) and chloroplatinic acid (0.0317 g). The reaction mixture exothermed to 153° C. 70 seconds after the PS-2 addition. The reaction mixture was stirred for 16 hours at 136° C. and injected into a teflon-coated mold. The sample was cured for 16 hours at 280° C. to give a hard, clear, glassy solid. The cross-linked polymers prepared in Examples 1 through 17 were subjected to thermogravimetric analysis in air or nitrogen to determine the temperature at which their thermal weight loss reached 10% and the residue remaining after increasing the temperature to 1100° C. at the rate of 20° per minute. Results are recorded in the following Table 1.

TABLE 1

| Example No. | TGA Atmosphere | 10% Wt. Loss (°C.) | % Residue |
|---|---|---|---|
| 1 | N$_2$ | 510 | 68 |
| 2 | Air | 480 | 66 |
| 3 | Air | 490 | 58 |
| 4 | N$_2$ | 500 | 64 |
| 5 | Air | 430 | 58 |
| 6 | N$_2$ | 540 | 63 |
| 7 | N$_2$ | 500 | 62 |
| 8 | N$_2$ | 500 | 52 |
| 9 | Air | 400 | 56 |
| 10 | N$_2$ | 525 | 72 |
| 11 | Air | 520 | 50 |
| 12 | N$_2$ | 510 | 68 |
| 13 | Air | 400 | 54 |
| 14 | N$_2$ | 550 | 75 |
| 15 | Air | 525 | 76 |
| 16 | N$_2$ | 510 | 67 |
| 17 | Air | 525 | 49 |

EXAMPLE 18

A complex of 0.0190 g of chloroplatinic acid and 48.54 g of dicyclopentadiene was prepared by heating at 170° C. under a nitrogen blanket for one hour. PS-2 (47.50 g) was added to the complex at 74° C. The reaction exothermed to 182° C. in 12 seconds. The opaque, milky white mixture that resulted was cooled to 30° C. and injected into a glass filled plaque mold and cured at 150° C. for 17 hours and 200° C. for 6 hours. The glass filled plaques were removed from the molds and post cured at 100° C. for 0.5 hours, 150° C. for 0.5 hours, 200° C. for 2 hours, 225° C. for 2 hours, 250° C. for 2 hours and 280° C. for 16 hours.

EXAMPLE 19

A complex of 0.0379 g of chloroplatinic acid and 94.75 g of dicyclopentadiene was prepared as described in Example 18. PS-2 (72.62 g) was added to the complex at 74° C. The reaction immediately exothermed to 144° C. The opaque, milky white mixture was cooled to 30° C. and injected into glass filled molds. The resin was cured as described in Example 18.

EXAMPLE 20

A complex of 0.0360 g of chloroplatinic acid and 45.99 g of dicyclopentadiene was prepared as described in Example 18. PS-2 (90.00 g) was slowly added to the complex at 72° C. The reaction immediately exothermed to 135° C. The resultant opaque, creamed colored mixture was cooled to 30° C. and injected into glass filled molds and cured at 150° C. for 15 hours and 200° C. for 8 hours. The glass filled plaques were removed from the mold and post cured as described in Example 18.

Physical properties of these glass filled resins are recorded in Table 2.

TABLE 2

| | | Physical Data Rheometrics | | | | | |
|---|---|---|---|---|---|---|---|
| Example No. | Wt. Glass | Tg (C) | G' (GPa) at T (C) | | | | |
| | | | 25 | 100 | 140 | 180 | 200 |
| 18 | 55 | 150 | 1.6 | 1.0 | 0.58 | 0.38 | 0.37 |
| 19 | 57 | 124 | 1.4 | 0.84 | 0.56 | 0.52 | 0.54 |
| 20 | 50.6 | 60 | 0.80 | 0.46 | 0.44 | 0.45 | 0.46 |

| | | Mechanical | | | |
|---|---|---|---|---|---|
| | | Flexural | | Tensile | |
| Example No. | Wt. Glass | Strength Ksi | Modulus Msi | Strength Ksi | Modulus Msi |
| 18 | 55 | 24.5 | 1.69 | 18.7 | 1.31 |
| 19 | 57 | 22.8 | 1.70 | 17.0 | 1.09 |
| 20 | 50.6 | 11.5 | 1.25 | 10.6 | 0.819 |

EXAMPLE 21

A dry, nitrogen sparged vessel was charged with dicyclopentadiene (17.14 g) and chloroplatinic acid (0.7369 g). The mixture was stirred for one hour at 70° C. and filtered through a 0.45 micron filter under a nitrogen atmosphere to give a greenish-brown solution. The platinum concentration was 3500 ppm.

A dry, nitrogen sparged three neck round bottom flask equipped with a mechanical stirrer, condenser, and a septum inlet was charged with hexane (500 g), dicyclopentadiene (245.20 g), and PS-1 (250.00 g). Catalyst concentrate (3×0.26 g) was added to the stirred solution every 2.5 hours. The reaction mixture was stirred for 15 hours (ambient temperature) after the final catalyst addition. Tetramethylethylene diamine (0.13 g) was added to 250 g of the reaction mixture. The resulting solution was stirred for one hour at room temperature. The hexane was removed under reduced pressure at 50° C. A sample of the resulting viscous liquid was heated in a nitrogen sparged oven at 150° C. for 2 hours and 250° C. for two hours to give a slightly turbid, hard, glassy solid.

EXAMPLE 22

A sample of the B-stage resin prepared in Example 21 (10 g) was mixed with Di-Cup R (dicumyl peroxide; available from Hercules Incorporated, Wilmington, Del.) (0.10 g). The resulting mixture was heated in a vacuum oven for one hour at 50° C. to give a clear viscous resin. The resin was heated in a nitrogen sparged oven at 150° C. for two hours and 275° C. for two hours to give a slightly yellow flexible elastomer.

While this invention has been described with respect to specific embodiments, it should be understood that these embodiments are not intended to be limiting and that many variations and modifications are possible without departing from the scope of this invention.

I claim:

1. A cross-linked or hydrosilation cross-linkable linear poly(organohydrosiloxane) polymer having at least 30% of its ≡Si—H groups reacted with hydrocarbon residues derived from polycyclic polyenes selected from the group consisting of unsubstituted or substituted cyclopentadiene oligomers, norbornadiene, norbornadiene dimer and dimethanohexahydronaphthalene.

2. A polymer as claimed in claim 1 wherein the polycyclic polyenes are selected from the group consisting of dicyclopentadiene, cyclopentadiene trimer, methyl dicyclopentadiene, norbornadiene, norbornadiene dimer and dimethanohexahydronaphthalene.

3. A polymer as claimed in claim 2 wherein the poly(organohydrosiloxane) is a trimethylsiloxy-terminated poly(methylhydrosiloxane).

4. A polymer as claimed in claim 1 wherein the poly(organohydrosiloxane) has the general formula:

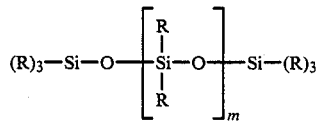

wherein R is a substituted or unsubstituted, saturated alkyl radical or a substituted or unsubstituted phenyl radical, and about 5% to about 50% of the R's are hydrogen and m is an integer from about 5 to 40.

5. A polymer as claimed in claim 4 which is a cross-linked, thermoset polymer.

6. A polymer as claimed in claim 4 wherein the polycylic polyene has chemically distinguishable double bonds and the resultant product is a hydrosilation cross-linkable polymer.

7. A polymer as claimed in claim 6 which is a liquid.

8. A polymer as claimed in claim 6 wherein the poly(organohydrosiloxane) has 30 to 60% of its ≡Si—H groups reacted.

9. A polymer as claimed in claim 1 wherein the polycyclic polyenes are selected from the group consisting of dicyclopentadiene and cyclopentadiene trimer.

10. A polymer as claimed in claim 1 wherein the polycyclic polymers are selected from dicyclopentadiene.

11. A polymer as claimed in claim 4 wherein the polycyclic polymers are selected from dicyclopentadiene.

12. A polymer as claimed in claim 8 which is a liquid.

13. A polymer as claimed in claim 1 wherein the poly(organohydrosiloxane) is a trimethylsiloxy-terminated poly(methylhydrosiloxane).

14. A polymer as claimed in claim 1 which is a cross-linked, thermoset polymer.

15. A polymer as claimed in claim 1 wherein the polycyclic polyene has chemically distinguishable double bonds and the resultant product is a cross-linkable polymer.

16. A polymer as claimed in claim 15 which is a liquid.

17. A polymer as claimed in claim 15 which is cross-linkable and wherein the poly(organohydrosiloxane) has 30 to 60% of its ≡Si—H groups reacted.

18. A cross-linked or hydrosilation cross-linkable linear poly(organohydrosiloxane) polymer comprising up to 80% fibrous reinforcement, the linear poly(organohydrosiloxane) having at least 30% of its ≡Si—H groups reacted with hydrocarbon residues derived from polycyclic polyenes selected from the group consisting of unsubstituted or substituted cyclopentadiene oligomers, norbornadiene, norbornadiene dimer and dimethanohexahydronaphthalene.

19. A polymer as claimed in claim 18 wherein the fibrous reinforcement is a woven mat of glass fibers.

20. A polymer as claimed in claim 18 wherein the polycyclic polyenes are selected from the group consisting of dicyclopentadiene, cyclopentadiene trimer, methyl dicyclopentadiene, norbornadiene, norbornadiene dimer and dimethanohexahydronaphthalene.

21. A polymer as claimed in claim 20 wherein the poly(organohydrosiloxane) has the general formula:

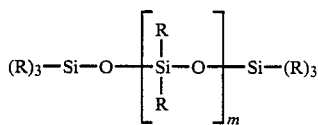

wherein R is a substituted or unsubstituted, saturated alkyl radical or a substituted or unsubstituted phenyl radical, and about 5% to about 50% of the R's are hydrogen and m is an integer from about 5 to 40%.

22. A polymer as claimed in claim 21 which is a cross-linked, thermoset polymer.

23. A polymer as claimed in claim 21 wherein the polycyclic polyenes are selected from the group consisting of dicyclopentadiene and cyclopentadiene trimer.

24. A polymer as claimed in claim 21 wherein the polycyclic polyenes are selected from dicyclopentadiene.

* * * * *

UNITED STATES PATENT AND TRADEMARK OFFICE
CERTIFICATE OF CORRECTION

PATENT NO. : 4,877,820
DATED : OCTOBER 31, 1989
INVENTOR(S) : COWAN 1-2

It is certified that error appears in the above-identified patent and that said Letters Patent is hereby corrected as shown below:

Column 3, Line 64

"hyrosilation" should read --hydrosilation--.

Signed and Sealed this

Nineteenth Day of March, 1991

Attest:

HARRY F. MANBECK, JR.

Attesting Officer

Commissioner of Patents and Trademarks

UNITED STATES PATENT AND TRADEMARK OFFICE
CERTIFICATE OF CORRECTION

PATENT NO. : 4,877,820

DATED : OCTOBER 31, 1989

INVENTOR(S) : COWAN

It is certified that error appears in the above-identified patent and that said Letters Patent is hereby corrected as shown below:

Column 1, Line 19

"known.as"   should read   --known as--

Column 2, Lines 20-22

"dimethylsiloxane-methylhy-
 dro
  siloxane copolymer,"   should read

--dimethylsiloxane-methylhy-
  drosiloxane copolymer,--

Column 2, Lines 23, 26, 28, 30, 32 & 40

Hyphens (-) need to be inserted at end of sentences

UNITED STATES PATENT AND TRADEMARK OFFICE
CERTIFICATE OF CORRECTION

PATENT NO. : 4,877,820

DATED : OCTOBER 31, 1989

INVENTOR(S) : COWAN

It is certified that error appears in the above-identified patent and that said Letters Patent is hereby corrected as shown below:

Column 2, Lines 34-36

"3-aminopropylmethylsilox-
  ane
  methylhydrosiloxane copolymer," should read

--3-aminopropylmethylsilox-
  ane-methylhydrosiloxane copolymer,--

Column 2, Lines 37-39

"2-phenylethylmethylsilox-
  ane
  methylhydrosiloxane copolymer, and" should read --2-phenylethylmethylsilox-
  ane-methylhydrosiloxane copolymer, and--

Column 3, Line 62

"musr" should read --must--

UNITED STATES PATENT AND TRADEMARK OFFICE
CERTIFICATE OF CORRECTION

PATENT NO. : 4,877,820
DATED : OCTOBER 31, 1989
INVENTOR(S) : COWAN

It is certified that error appears in the above-identified patent and that said Letters Patent is hereby corrected as shown below:

Column 5, Line 4

"liuid"   should read   --liquid--

Column 5, Line 54

"reactinn"   should read   --reaction--

Column 8, Line 9

"addd"   should read   --added--

Column 8, Line 23

"pentadiene"   should read   --dicyclopentadiene--

UNITED STATES PATENT AND TRADEMARK OFFICE
CERTIFICATE OF CORRECTION

PATENT NO. : 4,877,820

DATED : OCTOBER 31, 1989

INVENTOR(S) : COWAN

It is certified that error appears in the above-identified patent and that said Letters Patent is hereby corrected as shown below:

Column 8, Line 28

Paragraph should be inserted before "The cross-linked..."

Column 9, Line 27

Column Heading "Wt. Glass"  should read   --Wt.% Glass--

Column 9, Line 34

Column Heading "Wt. Glass"  should read   --Wt.% Glass--

Column 10, Line 9

"inventinn"  should read   --invention--

Column 10, Line 44

"polycylic"  should read   --polycyclic--

UNITED STATES PATENT AND TRADEMARK OFFICE
CERTIFICATE OF CORRECTION

PATENT NO. : 4,877,820
DATED : OCTOBER 31, 1989
INVENTOR(S) : COWAN

It is certified that error appears in the above-identified patent and that said Letters Patent is hereby corrected as shown below:

Column 10, Line 56

"polymers" should read --polyenes--

Column 10, Line 59

"polymers" should read --polyenes--

Column 12, Line 14

"40%." should read --40.--.

Signed and Sealed this

Twenty-sixth Day of March, 1991

Attest:

HARRY F. MANBECK, JR.

Attesting Officer    Commissioner of Patents and Trademarks